June 8, 1926.  
C. E. SARGENT  
EDUCTOR  
Filed April 17, 1925
1,587,864
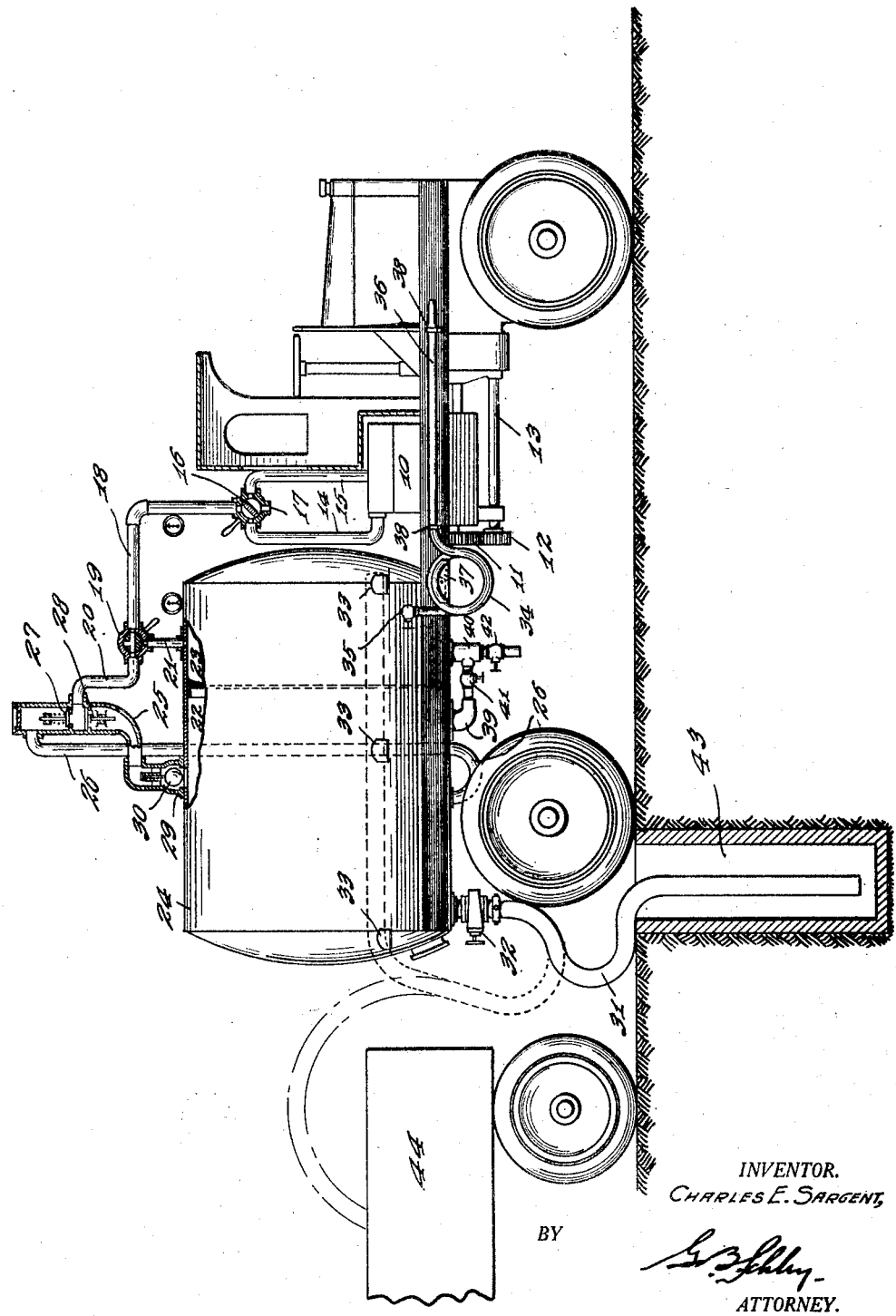
INVENTOR.  
CHARLES E. SARGENT,  
BY  
ATTORNEY.

Patented June 8, 1926.

1,587,864

UNITED STATES PATENT OFFICE.

CHARLES E. SARGENT, OF ELGIN, ILLINOIS.

EDUCTOR.

Application filed April 17, 1925. Serial No. 23,755.

It is the object of my invention to produce an eductor, or a portable apparatus for use in cleaning sewer catch-basins; which eductor may be filled with contents of several catch basins and may then be readily and quickly emptied.

I accomplish the above objects by mounting a two-compartment tank on an automobile truck, I provide means also mounted on the truck for subjecting either or both tank-compartments to a partial vacuum or to pressure, and I provide a flexible hose which may be dropped into a catch-basin and through which the contents of the basin may be drawn into one of the tank-compartments.

The accompanying drawing, consisting of one figure, is a side elevation in partial section showing my eductor.

My eductor comprises an air compressor 10 mounted on an automobile truck and arranged to be driven from the automobile engine through the gears 11 and 12 and the shaft 13. The inlet and the discharge openings of the compressor are connected respectively by the pipes 14 and 15 to opposite ports of a four-way valve 16. Another port 17 of the valve 16 is open to the atmosphere, and the fourth port is connected by a pipe 18 with a three-way valve 19, the other two ports of which are connected respectively by pipes 20 and 21 to the two compartments 22 and 23 of a tank 24.

Preferably, the tank compartment 22, which is the compartment that receives the contents of the catch-basin, is larger than the other compartment 23. The pipe 20 does not lead directly to the compartment 22 but divides into two branches 25 and 26 leading respectively to the top and bottom of the compartment 22, the lower end of the branch 26 preferably being arranged to discharge upward in such compartment. The branch pipe 26 is provided with a check valve 27 opening in a direction to permit flow from the pipe 20, and the pipe 25 is provided with a check valve 28 opening in a direction to permit flow from the compartment 22 to the pipe 20. The pipe 25 is also provided with a float valve 29, the float 30 of which will rise on the surface of liquid or solid matter in the compartment 22 and prevent the entrance of any such matter into the pipe 25.

A non-collapsible hose 31 is connected to the bottom of the tank-compartment 22 through a valve 32. Preferably, I provide several hooks 33 on which the hose 31 may be placed when the automobile is being driven.

A flexible hose 34 connected through a valve 35 with the lower part of a tank-compartment 23 is provided at its other end with a stirring pipe 36. The automobile may be provided with a support 37 on which the hose 34 may be coiled, and hooks 38 may be provided for the support of the pipe 36.

The compartments 22 and 23 are provided respectively with drains 39 and 40 which may be connected together through a valve 41. One of the drains, here shown as the drain 40, is provided with a short extension including a valve 42.

The drawing illustrates my eductor in the process of withdrawing the contents of the catch-basin. The compressor 10 is being driven from the engine, the valves 16 and 19 are in their respective positions shown, and the valve 32 is open. The compressor 10 acts to withdraw air from the compartment 22 through the pipes 25, 20, 18, and 14 and discharges such air through the pipe 15 and valve-port 17. The reduction of pressure thus caused in the compartment 22 results in the transfer of the contents of the catch basin 43 to the tank-compartment 22. Should the contents of the basin 43 be too viscous to be readily drawn up through the hose 31 they may be agitated by the pipe 36 and at the same time thinned by the addition of water from the compartment 23.

If the head of water in the tank-compartment 23 should be insufficient to cause flow through the pipe 36, air pressure may be applied to the tank 23 by suitably arranging the valves 16 and 19. To do this, the exhaust pipe 15 of the compressor is connected to the pipe 18 by turning the handle of the valve 16 through 90°, and the pipe 18 is connected through the pipe 21 to the compartment 23 by turning the handle of the valve 19 through 90° in a clockwise direction.

When the catch basin 43 has been emptied, the valve 32 is closed, the hose 31 placed on the hooks 33 in the dotted-line position shown in the drawing, and the eductor driven to the next catch-basin. Several basins may be emptied in turn until the compartment 22 is full. When the compartment 22 fills, the float 30 of the float-valve 29 is raised and prevents any liquid or solid matter from entering the pipe 25.

To empty the compartment 22 it is only necessary to place the hose 31 in a convenient receptacle, such as the body 44 of an automobile dump-truck, open the valve 32, and apply pressure to the tank-compartment 22. To do this, the pipe 15 is connected with the pipe 18 by adjustment of the valve 16 in the manner above described, the valve 19 being in the position shown. The air compressor will then draw in air through the valve-port 17 and pipe 14 and discharge such air through the pipes 15, 18, 20, and 26, the check valve 28 preventing any air flow through the pipe 25. The air discharged from the pipe 26 at the bottom of the compartment 22 will rise through the material in the compartment, loosen and agitate it, and will discharge it through the hose 31 when sufficient pressure is accumulated in the tank-compartment.

The tank compartment 23 may be provided with an opening for the purpose of filling it with water, or it may be filled by withdrawing the air from it and inserting the end of the pipe 38 in a convenient source of water supply.

While primarily designed for use as an eductor, the apparatus above described may be used as a flusher. When so used, the tank compartments 22 and 23 are filled with water, the discharge pipe 15 of the air compressor connected to the pipe 18 and the handle of the valve 19 turned 180° from the position illustrated in the drawing. This arrangement of the valve 19 enables the compressor 10 to apply pressure to both tank-compartments. The flushing apparatus may be controlled by the valve 42.

I claim as my invention:—

1. An eductor, comprising two tanks, an air compressor, inlet and discharge pipes for said compressor, a four-way valve, said inlet and discharge pipes being connected respectively to two of the ports of said valve, a third port of said valve being open to atmosphere, a pipe connected to the fourth port of said valve, a three-way valve, said last-named pipe being connected to one port of said three-way valve and pipes respectively connecting the other two ports of said three-way valve with said two tanks.

2. An eductor as set forth in claim 1 with the addition that the pipe connecting said three-way valve with one of said tanks has two branches, one of said branches leading to the bottom of said tank and the other to the top of said tank.

3. An eductor as set forth in claim 1 with the addition that the pipe connecting said three-way valve with one of said tanks has two branches, one of said branches leading to the bottom of said tank and the other to the top of said tank, and the branch pipe leading to the top of said tank is provided with a check-valve opening toward such three-way valve.

4. An eductor as set forth in claim 1 with the addition that the pipe connecting said three-way valve with one of said tanks has two branches, one of said branches leading to the bottom of said tank and the other to the top of said tank, and the branch pipe leading to the bottom of said tank is provided with a check-valve opening toward such tank.

5. An eductor as set forth in claim 1 with the addition that the pipe connecting said three-way valve with one of said tanks has two branches, one of said branches leading to the bottom of said tank and the other to the top of said tank, and a check-valve in each of said branch pipes, one of said check-valves opening toward said tank and the other toward said three-way valve.

6. An eductor as set forth in claim 1 with the addition that the pipe connecting said three-way valve with one of said tanks has two branches, and a check-valve in each of said branch pipes, one of said check-valves opening toward said tank and the other toward said three-way valve.

7. An eductor, comprising two tanks, an air compressor having an inlet and an outlet, pipes between said air compressor and said tanks, and valve means in said pipes for connecting either or both of said tanks with the inlet or outlet of said compressor.

8. An eductor, comprising two tanks, an air compressor having an inlet and an outlet, pipes between said air compressor and said tanks, and valve means in said pipes for connecting the inlet or outlet of said compressor with either of said tanks or with the atmosphere.

9. An eductor, comprising two tanks, an air compressor having an inlet and an outlet, pipes between said air compressor and said tanks, and valve means in said pipes for connecting either or both of said tanks with the outlet of said compressor.

10. An eductor, comprising two tanks, an air compressor having an inlet and an outlet, pipes between said air compressor and said tanks, and valve means in said pipes for connecting either or both of said tanks with the inlet of said compressor.

11. An eductor, comprising an automobile, two tanks mounted on said automobile, a conduit connected to one of said tanks and adapted to be lowered into a catch-basin, a stirring pipe flexibly connected with the other of said tanks, and means for forcing air into and exhausting air from either or both of said tanks.

12. An eductor, comprising an automobile, two tanks mounted on said automobile, a conduit connected to one of said tanks and adapted to be lowered into a catch-basin, a stirring pipe flexibly connected with the other of said tanks, and means for forcing air into and exhausting air from either of said tanks.

13. An eductor, comprising an automobile, two tanks mounted on said automobile, a conduit connected to one of said tanks and adapted to be lowered into a catch-basin, a stirring pipe flexibly connected with the other of said tanks, means for forcing air into both said tanks and for exhausting air from one of them, a pipe connected with one of said tanks near the bottom thereof, a valve in said pipe, a second pipe connected with the other of said tanks near the bottom thereof and with said first-named pipe at a point between said valve and the tank with which said first-named pipe connects, and a valve in said second pipe.

14. In an eductor, a tank for receiving the contents of catch-basins, means for exhausting air from said tank at the top thereof and for forcing air into said tank at the bottom thereof.

In witness whereof, I have hereunto set my hand at Elgin, Illinois, this 13th day of April, A. D. one thousand nine hundred and twenty-five.

CHARLES E. SARGENT.